May 28, 1968   F. E. AIZLEY   3,385,633
SAFETY BELTS AND COMBINATIONS OF SUCH BELTS
AND ANCHORS THEREFOR
Original Filed Nov. 27, 1964   2 Sheets-Sheet 1

INVENTOR
FRANK E. AIZLEY
BY
ATTORNEY

May 28, 1968   F. E. AIZLEY   3,385,633
SAFETY BELTS AND COMBINATIONS OF SUCH BELTS
AND ANCHORS THEREFOR
Original Filed Nov. 27, 1964   2 Sheets-Sheet 2

INVENTOR
FRANK E. AIZLEY

BY

ATTORNEY

United States Patent Office 3,385,633
Patented May 28, 1968

3,385,633
SAFETY BELTS AND COMBINATIONS OF SUCH
BELTS AND ANCHORS THEREFOR
Frank E. Aizley, 334 Washington Ave.,
Chelsea, Mass. 02150
Continuation of application Ser. No. 414,214, Nov. 27,
1964. This application Dec. 29, 1966, Ser. No. 605,937
3 Claims. (Cl. 297—389)

ABSTRACT OF THE DISCLOSURE

Safety seat belt and anchor means, the anchor means including a member extending transversely of a vehicle seat adjacent its back and a second member adjacent the upper end of the back, the belt including a member attachable about the waist of a wearer and at least one shoulder retainer slidably attached to the second anchor member and connected to one of the other members, and a rigid connection between the belt member and the first named anchor member and slidable relative to both of them.

Figure 2:
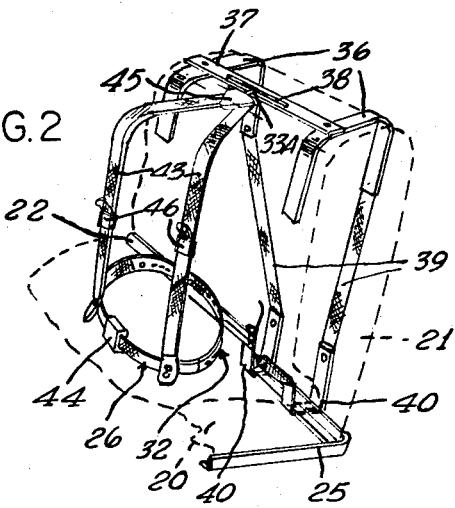

This application is a continuation of application Ser. No. 414,214, filed Nov. 27, 1964, now abandoned.

The present invention relates to safety belts and to combinations of such belts and anchors therefor.

The most common examples of the use of safety belts are automobile and airplane seat belts. It is commonly recognized that the use of such belts is an effective means of reducing the severity of injuries resulting from certain types of accidents. Their effectiveness depends, of course, on their being worn and one difficulty is that such belts so restrict normal movements that people do not attach them or, if they do, soon detach them in order to enjoy freedom of movement unless hazardous conditions are particularly apparent.

The general objectives of the invention are best summarized as the provision of safety belts, both with and without anchor combinations, that permit the wearer a sufficient amount of motion so as to make the wearing of a safety belt an acceptable practice.

In accordance with the invention, such a result is attained by providing a safety harness with seat belt member for attachment about a person, an anchor member attachable securely in a position adjacent the person with a member extending transversely of the seat adjacent its junction with the back, and a rigid connection between the members and slidable relative to both of them to a predetermined extent. Thus, a person wearing the belt member is free to turn and slide from side-to-side to a limited extent. A second anchor member extends transversely of the upper part of the seat and the harness includes at least one shoulder retainer slidably connected thereto to permit limited side-to-side movement of the upper part of the body of the wearer.

In the accompanying drawings, there are shown illustrative embodiments of the invention from which these and other of its objectives, novel features, and advantages will be apparent.

Figure 1:
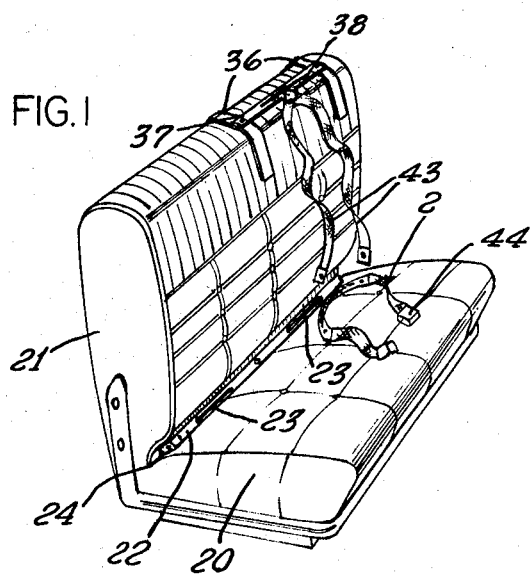
Figure 3:
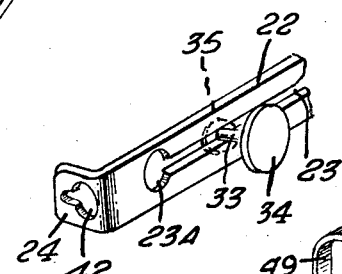
Figure 5:
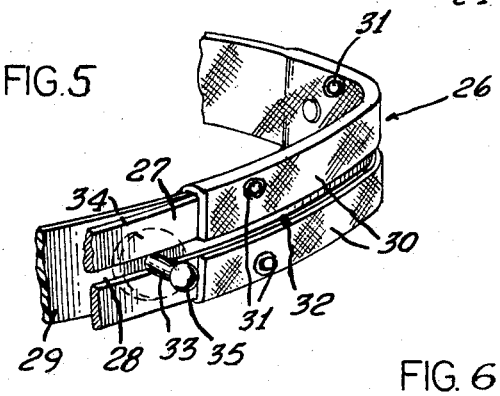
Figure 4:
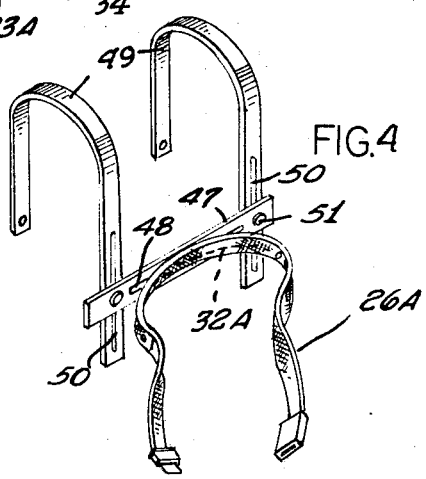
Figures 6, 7:
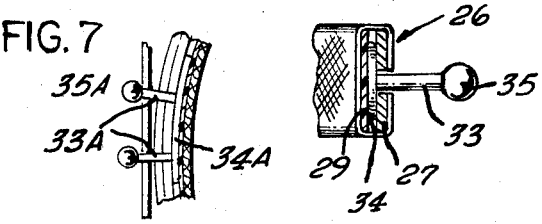
Figure 8:
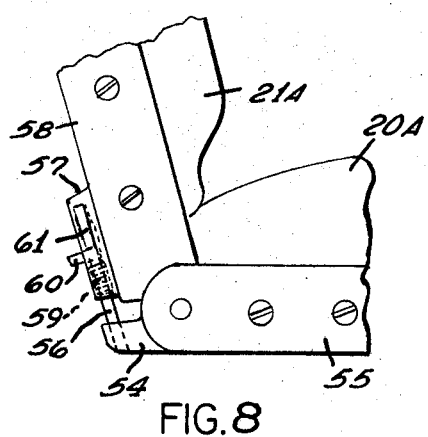
Figure 9:
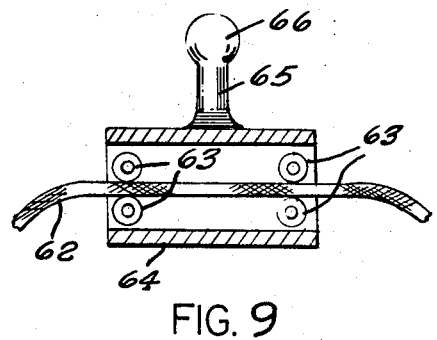
Figure 10:
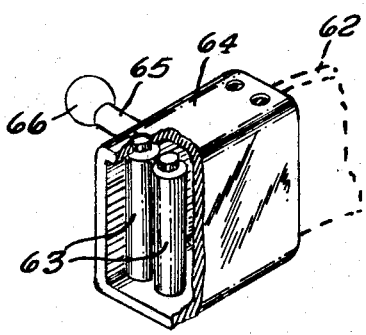
Figure 11:
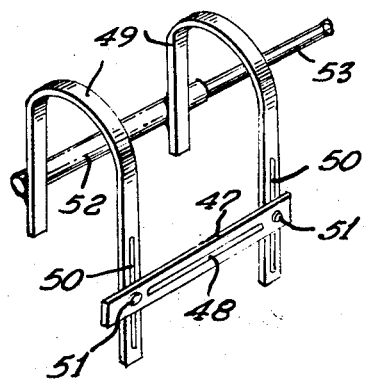

In the drawings:

FIGURE 1 is a front perspective view of a seat equipped with a safety belt and anchor members in accordance with the invention, the combination including shoulder straps, FIGURE 2 is a similar view, on an increased scale with the belt member and straps shown as positioned for use and with the seat shown only in broken lines to enable other details to be illustrated, FIGURE 3 is a fragmentary perspective view of the anchor member on a further increase of scale, FIGURE 4 is a front perspective view of another embodiment of the invention, the combination being particularly for use by small children, FIGURE 5 is a fragmentary and partly sectioned view of a belt member, FIGURE 6 is a cross sectional view of the belt member, FIGURE 7 is a like view of a modification of the invention, FIGURE 8 is an end view of a folding automobile seat with a lock to prevent the folding thereof, FIGURE 9 is a longitudinal section illustrating a modification of the invention, FIGURE 10 is a partly sectioned perspective view of the modification of FIGURE 9, and FIGURE 11 is a view, similar to FIGURE 4, but with the belt member omitted, the anchor member including means for use if the seat is a folding one, to prevent its being independently folded.

Reference is first made to FIGURE 1 wherein there is shown an automobile seat 20 of the type having a fixed back 21. A transverse anchor member 22 is shown at the junction of the seat and back where its presence will not be noticeable to the seat occupants. The anchor member 22 is shown as having a pair of spaced, alined slots 23 and end flanges 24, and while the details of the seat construction are not important to the present invention, it includes a frame 25, see FIGURE 2, to which the anchor member 22 may be secured as by means presently to be described.

A safety belt is generally indicated at 26 and is shown as including in its rear part, a metal strip 27 having a longitudinal slot 28 backed by a plastic strip 29 and with marginal belt material 30 disposed over the margins of the strip 27 with the several belt components locked together as by rivets 31. By these or like means, a safety belt is provided with a lengthwise, outwardly opening channel generally indicated at 32 extending around the back portion of the belt to a desired extent. The metal strip 29 may be curved but it is preferably flexible.

Each safety belt 26 has a connector 33 shown as having heads 34 and 35, the head 34 being slidably held within the belt channel 32 and the head 35 being slidably held by the anchor member 22 with the connector 33 extending through an appropriate one of the slots 23. Where detachability of the belts from the anchor member 22 is wanted, the slots 23 of the anchor member 32 may each have enlargements 23A through which the connector heads 33 may be freely entered or withdrawn.

By this construction, not only is the person free to turn relatively to the anchor member to a predetermined extent with the belt 26 attached but also he may shift from side-to-side since the connector 33 is slidable throughout the full length of the slot, the slot length being such as to prevent such lateral movements as might increase the risk of bodily injury in the event of an accident.

A pair of U-shaped members 36 for each occupant fit over the upper end of the seat back 21 and these are interconnected by an anchor member 37 shown as extending along the top of the seat back 21 and as having a lengthwise slot 38. Each of the members is connected by a strap 39 to a hook 40 caught under the frame 25. One hook includes a stud 41 for entry into a keyhole opening 42 with which each end of the anchor 22 is provided thereby to secure it in place.

Shoulder straps 43 are anchored to the front part of the belt member 26, one on each side of its buckle 44, and their upper ends are interconnected by a plate 45 carrying a connector 33A which may be identical to the connector 33 but having a downwardly bent end. Each strap 43 includes a buckle 46 enabling its effective length to be adjusted to afford a desired amount of freedom of motion without loss of security.

The embodiment of the invention illustrated by FIGURE 4 is particularly for use by small children. The belt member 26A may be generally similar to the belt member 26 and is attached to a transverse anchor member 47 by a connector, not shown, but which may be of the same type as the connector 32, the anchor member 47 having a slot 48 through which the connector passes. The anchor member 47 is connected to U-shaped members 49 fitted over the upper part of the seat and in order that the position of the belt member 26A may be adjusted vertically relative thereto, the members 49 have vertical slots 50 through which attaching rivets 51 extend, thereby providing a sliding attachment of the anchor member 47.

If the seat occupied by the child wearing the seat belt just described is a folding seat, the embodiment of the invention illustrated by FIGURE 11 may be used which features the addition of a transverse rod 52 anchored to the rear ends of the members 49 and including a telescoping part 53 extendable to engage the rear of the driver's seat to be held thereby against being folded independently thereof.

A folding seat may be provided with the lock illustrated by FIGURE 8. The seal lock therein shown includes a keeper 54 on the base 55 of the seat 20A and a bolt 56 slidable in a housing 57 on the frame 58 of the seat back 21A, the housing 57 being shown as having a bolt retracting spring 59 when the bolt handle 60 is swung to bring it into alinement with the slot 61.

In FIGURES 9 and 10, a belt 62 is shown as passing between pairs of rollers 63 vertically journalled in an open-ended housing 64 whose rear wall is provided with a connector arm 65 terminating in a head 66 for sliding entry in an anchor member slot. As the belt 62 passes freely between the pairs of rollers 63, the wearer may turn freely.

If desired, see FIGURE 7, the connection between a seat belt in accordance with the invention and its anchor may include a pair of connectors 33A each having a common head 34A and heads 35A.

From the foregoing it will be apparent that the invention ensures sufficient ranges of freedom of motion to the wearer, by permitting turning movement, side-to-side movement, or both, without loss of protection in the event of an accident.

I claim:

1. In combination and for use with a vehicle seat having a back, a safety harness including a belt member for attachment about the waist of a person, anchor means to be anchored adjacent the seat and including a transverse member adjacent the junction of the seat and back, a rigid connector attached to said anchor and belt members and slidable relative to both members, second anchor means extending transversely of the back adjacent the upper end thereof, and said harness including at least one shoulder retainer connected to one of said members and connected to said second anchor means to slide lengthwise thereof.

2. The combination of claim 1 in which the member to which the shoulder retainer is connected is the belt member.

3. The combination of claim 1 in which the second anchor means extends transversely of the upper end of the back.

References Cited
UNITED STATES PATENTS

| | | | |
|---|---|---|---|
| 1,712,198 | 5/1929 | Clapp | 297—387 |
| 2,695,052 | 11/1954 | Yates et al. | 297—387 |
| 2,725,853 | 12/1955 | Nordheim | 182—3 X |
| 2,726,714 | 12/1955 | McAndrews | 297—387 |
| 2,833,343 | 5/1958 | Benson | 297—387 |
| 3,004,519 | 10/1961 | Weissman | 182—3 |
| 3,006,645 | 10/1961 | Frazier | 182—3 X |

FOREIGN PATENTS

| | | |
|---|---|---|
| 1,355,688 | 2/1964 | France. |

JAMES T. McCALL, *Primary Examiner.*